United States Patent
Yokomakura et al.

(10) Patent No.: US 9,191,080 B2
(45) Date of Patent: Nov. 17, 2015

(54) RECEPTION DEVICE, TRANSMISSION DEVICE, RECEPTION METHOD, TRANSMISSION METHOD, PROGRAM, AND RADIO COMMUNICATION SYSTEM

(75) Inventors: Kazunari Yokomakura, Osaka (JP); Osamu Nakamura, Osaka (JP); Jungo Goto, Osaka (JP); Yasuhiro Hamaguchi, Osaka (JP); Hiroki Takahashi, Osaka (JP); Seiichi Sampei, Ikeda (JP); Shinsuke Ibi, Suita (JP); Shinichi Miyamoto, Takatsuki (JP)

(73) Assignees: SHARP KABUSHIKI KAISHA, Osaka (JP); OSAKA UNIVERSITY, Osaka (JP)

( * ) Notice: Subject to any disclaimer, the term of this patent is extended or adjusted under 35 U.S.C. 154(b) by 57 days.

(21) Appl. No.: 14/000,746

(22) PCT Filed: Feb. 24, 2012

(86) PCT No.: PCT/JP2012/054588
§ 371 (c)(1),
(2), (4) Date: Aug. 21, 2013

(87) PCT Pub. No.: WO2012/115232
PCT Pub. Date: Aug. 30, 2012

(65) Prior Publication Data
US 2013/0329830 A1 Dec. 12, 2013

(30) Foreign Application Priority Data
Feb. 25, 2011 (JP) ................................. 2011-040680

(51) Int. Cl.
*H04B 7/10* (2006.01)
*H04L 1/02* (2006.01)
(Continued)

(52) U.S. Cl.
CPC ............ *H04B 7/0413* (2013.01); *H04L 1/0071* (2013.01)

(58) Field of Classification Search
CPC .... H04L 1/06; H04L 27/2647; H04B 7/0845; H04B 7/0854; H04B 7/0857
USPC .................. 375/130–153, 259–285, 295–353
See application file for complete search history.

(56) References Cited

U.S. PATENT DOCUMENTS

| 8,411,806 B1 * | 4/2013 | Lee et al. ....................... 375/341 |
| 2003/0064690 A1 * | 4/2003 | Kasapi .......................... 455/101 |

(Continued)

FOREIGN PATENT DOCUMENTS

| JP | 2009-16963 A | 1/2009 |
| JP | 2009-188551 A | 8/2009 |
| WO | WO 2005/050885 A1 | 6/2005 |

OTHER PUBLICATIONS

3GPP TR36.814 v.9.0.0 (Mar. 2010).
(Continued)

*Primary Examiner* — James M Perez
(74) *Attorney, Agent, or Firm* — Birch, Stewart, Kolasch & Birch, LLP

(57) ABSTRACT

A reception device comprises a reception unit for receiving signals transmitted by assigning respectively a plurality of different frequency signal groups, which are generated based on a same bit sequence, to a plurality of layers, an MIMO separation unit for executing MIMO separation of the signals, received by the reception unit, into the frequency signal groups corresponding respectively to the plural layers, and a merging unit for merging individual items of information based on the frequency signal groups obtained by the MIMO separation, the items of information corresponding respectively to the plural layers.

4 Claims, 12 Drawing Sheets

(51) Int. Cl.
*H04B 7/04* (2006.01)
*H04L 1/00* (2006.01)

(56) References Cited

U.S. PATENT DOCUMENTS

| | | | |
|---|---|---|---|
| 2004/0257978 A1* | 12/2004 | Shao et al. | 370/208 |
| 2004/0258174 A1* | 12/2004 | Shao et al. | 375/267 |
| 2005/0052991 A1* | 3/2005 | Kadous | 370/216 |
| 2005/0157682 A1* | 7/2005 | Sandhu | 370/334 |
| 2005/0159115 A1* | 7/2005 | Sandhu | 455/101 |
| 2005/0201478 A1* | 9/2005 | Claussen et al. | 375/261 |
| 2006/0223460 A1* | 10/2006 | Himayat et al. | 455/101 |
| 2007/0140377 A1 | 6/2007 | Murakami et al. | |
| 2008/0310526 A1* | 12/2008 | Maltsev et al. | 375/260 |
| 2009/0122838 A1* | 5/2009 | Yamasuge | 375/133 |
| 2009/0196332 A1 | 8/2009 | Miyatani | |
| 2010/0177845 A1 | 7/2010 | Murakami et al. | |

OTHER PUBLICATIONS

3GPP TS36.211 v.8.9.0 (Dec. 2009).

Bing Yuan et al., A Bit Interleaved Repetition Coded Base Station Cooperation for Downlink OFDM Signaling (2011).

Bing Yuan et al., A Study on Iterative Receiver for Base Station Cooperations Under Inter-Node Carrier Phase Asynchronous Environments (2011).

* cited by examiner

RECEPTION DEVICE, TRANSMISSION DEVICE, RECEPTION METHOD, TRANSMISSION METHOD, PROGRAM, AND RADIO COMMUNICATION SYSTEM

TECHNICAL FIELD

The present invention relates to a reception device, a transmission device, a reception method, a transmission method, a program, and a radio communication system.

The present application claims priority on the basis of Japanese Patent Application No. 2011-040680, filed in the Japan Patent Office on Feb. 25, 2011, the entire contents of which are incorporated herein by reference.

BACKGROUND ART

Introducing radio communication systems with highly-advanced transfer schemes have been actively studied in recent years. Examples of the studied radio communication systems are multi-antenna transmission using a plurality of transmission antennas, and CoMP (Coordinated Multi-Point transmission and reception) in which data destined for the same mobile station device is transmitted in a coordinated manner using a plurality of base stations or transmission points.

When one data is transmitted using a plurality of transmission antennas, a precoding technique is employed to keep transmission signals, transmitted from the individual transmission antennas, in the same phase at the time of reception. In the LTE (Long Term Evolution) system of which service has started from December, 2010, for example, the multi-antenna transmission is realized by selecting an index (PMI: Precoding Matrix Indicator) of one among a set of predefined precoding matrices, which one provides maximum performance, and by feeding back the selected PMI from a mobile station device to a base station device (see Non Patent Literature (NPL) 1). Theoretically, a right singular vector corresponding to a maximum singular value among plural singular values, including the case of one singular value, obtained with SVD (Singular Value Decomposition) of a channel matrix between the mobile station device and the base station device is regarded to be optimum as a precoding matrix. For example, the Singular Value Decomposition is expressed by the following formula (a1).

$$H = UVD^H \tag{a1}$$

In the above formula, U and V are Unitary matrices of which inverse matrices are adjoint matrices thereof, and which have a size of the number of reception antennas×the number of reception antennas and a size of the number of transmission antennas×the number of transmission antennas, respectively. D is called a singular value matrix, i.e., a matrix having singular values as diagonal elements, and D is a diagonal matrix having a size of the number of reception antennas× the number of transmission antennas. H is a channel matrix of complex numbers for a channel between the base station device and the mobile station device, and H has a size of the number of reception antennas×the number of transmission antennas. The channel matrix H is expressed by the following formula (a2).

$$H = \begin{bmatrix} H_{11} & \cdots & H_{1N_t} \\ \vdots & \ddots & \vdots \\ H_{N_r 1} & \cdots & H_{N_r N_t} \end{bmatrix} \tag{a2}$$

In the above formula, $N_r$ denotes the number of reception antennas, and $N_t$ denotes the number of transmission antennas. $H_{nm}$ denotes a channel characteristic between an m-th transmission antenna and an n-th reception antenna, and it is expressed by complex numbers.

The CoMP is described below. In the CoMP, points transmitting the same data are geographically apart from one another. Although a technique similar to that in the above-described multi-antenna transmission can be used, the transmission is performed while synchronism is established among the transmitting points on condition that channel information (or information related to a precoding matrix, such as the PMI) and transmission data are shared among all the transmitting points (see NPL 2). The term "synchronism" used here implies that a deviation in carrier frequency is small among base stations, and that reception timings at which mobile station devices receive the transmission data are matched with each other.

CITATION LIST

Non Patent Literature

NPL 1: 3GPP TS36.211 v.8.9.0
NPL 2: 3GPP TR36.814 v.9.0.0

SUMMARY OF INVENTION

Technical Problem

In the above-described transmission using the precoding matrix, however, it is practically impossible to select optimum one, which is to be used, among the predefined precoding matrices as in NPL 1, or to previously obtain precise channel information in the transmission. This leads to a problem that an optimum precoding matrix enabling a waveform to be synthesized so as to maximize reception power cannot be employed, and that the transmission cannot be performed with sufficiently high efficiency of frequency use.

The present invention has been made in view of the above-described situations in the art, and an object of the present invention is to provide a reception device, a transmission device, a reception method, a transmission method, a program, and a radio communication system, with which signal transfer can be performed with high efficiency of frequency use.

Solution to Problem (1) The present invention has been made to solve the above-described problems. According to a first aspect of the present invention, there is provided a reception device comprising a reception unit for receiving signals transmitted by assigning respectively a plurality of different frequency signal groups, which are generated based on a same bit sequence, to a plurality of layers, an MIMO separation unit for executing MIMO separation of the signals, received by the reception unit, into the frequency signal groups corresponding respectively to the plural layers; and a combining unit for merging individual items of information based on the frequency signal groups obtained by the MIMO demultiplexing, the items of information corresponding respectively to the plural layers.

(2) In the first aspect of the present invention, the frequency signal groups assigned respectively to the plural layers may be frequency signal groups based on bit sequences that are obtained by applying different interleaves, for each of the plural layers, to a coded bit sequence resulting from channel coding of the bit sequence, and the items of information merged by the merging unit may be bit LLRs obtained by applying de-interleaves to bit LLRs, which are based on the frequency signal groups resulting from the separation by the MIMO demultiplexing unit, with intent to de-interleave the different interleaves having been applied for each of the plural layers.

(3) In the first aspect of the present invention, the frequency signal groups assigned respectively to the plural layers may be signals obtained by applying different interleaves in frequency domain for each of the plural layers, and the items of information merged by the combining unit may be signals obtained by applying de-interleaves to the frequency signal groups, which are resulted from the separation by the MIMO demultiplexing unit, with intent to de-interleave the different interleaves having been applied for each of the plural layers.

(4) In the first aspect of the present invention, the interleaves may be cyclic shifts in a frequency direction.

(5) According to a second aspect of the present invention, there is provided a transmission device comprising a transmission unit for assigning a plurality of different frequency signal groups, which are generated based on a same bit sequence, to a plurality of layers and transmitting the frequency signal groups, wherein the frequency signal groups are frequency signal groups different for each of the plural layers.

(6) In the second aspect of the present invention, the plural different frequency signal groups may be frequency signal groups based on bit sequences that are obtained by applying different interleaves, for each of the plural layers, to a coded bit sequence resulting from channel coding of the bit sequence.

(7) In the second aspect of the present invention, the plural different frequency signal groups may be frequency signal groups obtained by applying different interleaves in frequency domain for each of the plural layers.

(8) In the second aspect of the present invention, the interleaves may be cyclic shifts in a frequency direction.

(9) According to a third aspect of the present invention, there is provided a transmission device comprising a transmission unit for transmitting a frequency signal group generated based on a same bit sequence as that for another transmission device, wherein the frequency signal group is different from a frequency signal group transmitted by the other transmission device.

(10) According to a fourth aspect of the present invention, there is provided a reception method comprising the steps of receiving signals transmitted by assigning respectively a plurality of different frequency signal groups, which are generated based on a same bit sequence, to a plurality of layers, executing MIMO demultiplexing of the received signals into the frequency signal groups corresponding respectively to the plural layers, and merging individual items of information based on the frequency signal groups obtained by the MIMO demultiplexing, the items of information corresponding respectively to the plural layers.

(11) According to a fifth aspect of the present invention, there is provided a transmission method comprising the steps of generating, based on a same bit sequence, a plurality of frequency signal groups that are different for each of plural layers, assigning the signals to the plural layers, and transmitting the signals.

(12) According to a sixth aspect of the present invention, there is provided a transmission method comprising the steps of generating, based on a same bit sequence, a frequency signal group that is different from a frequency signal group transmitted by another transmission device, and transmitting the frequency signal group generated based on the same bit sequence as that for the other transmission device.

(13) According to a seventh aspect of the present invention, there is provided a program causing a computer of a reception device to function as a reception unit for receiving signals transmitted by assigning respectively a plurality of different frequency signal groups, which are generated based on a same bit sequence, to a plurality of layers, an MIMO demultiplexing unit for executing MIMO demultiplexing of the signals, received by the reception unit, into the frequency signal groups corresponding respectively to the plural layers, and a combining unit for merging individual items of information based on the frequency signal groups obtained by the MIMO demultiplexing, the items of information corresponding respectively to the plural layers.

(14) According to an eighth aspect of the present invention, there is provided a program causing a computer of a transmission device to function as a signal generation unit for generating, based on a same bit sequence, a plurality of frequency signal groups that are different for each of plural layers, and a transmission unit for assigning the signals to the plural layers, and transmitting the signals.

(15) According to a ninth aspect of the present invention, there is provided a program causing a computer of a transmission device to function as a signal generation unit for generating, based on a same bit sequence, a frequency signal group that is different from a frequency signal group transmitted by another transmission device, and a transmission unit for transmitting the frequency signal group generated based on the same bit sequence as that for the other transmission device.

(16) According to a tenth aspect of the present invention, there is provided a radio communication system including a plurality of transmission devices and a reception device, each of the plural transmission devices comprising a transmission unit for transmitting a plurality of different frequency signal groups that are generated based on a same bit sequence, the reception device comprising a reception unit for receiving signals transmitted from the transmission units of the plural transmission devices, an MIMO demultiplexing unit for executing MIMO demultiplexing of the signals, received by the reception unit, into the frequency signal groups corresponding respectively to the plural transmission devices, and a combining unit for merging individual items of information based on the frequency signal groups obtained by the MIMO demultiplexing, the items of information corresponding respectively to the plural transmission devices.

(17) In the tenth aspect of the present invention, the frequency signal groups assigned respectively to the plural transmission devices may be frequency signal groups based on bit sequences that are obtained by applying different interleaves, for each of the plural transmission devices, to a coded bit sequence resulting from channel coding of the bit sequence, and the items of information merged by the combining unit may be bit LLRs obtained by applying de-interleaves to bit LLRs, which are based on the frequency signal groups resulting from the separation by the MIMO demultiplexing unit, with intent to de-interleave the different interleaves having been applied for each of the plural transmission devices.

(18) In the tenth aspect of the present invention, the frequency signal groups assigned respectively to the plural transmission devices may be signals obtained by applying different interleaves in frequency domain for each of the plural transmission devices, and the items of information merged by the combining unit may be signals obtained by applying de-interleaves to the frequency signal groups, which are resulted from the separation by the MIMO demultiplexing unit, with intent to de-interleave the different interleaves having been applied for each of the plural transmission devices.

Advantageous Effects of Invention

According to the present invention, signal transfer can be performed with high efficiency of frequency use.

DESCRIPTION OF EMBODIMENTS

First Embodiment

Figure 1:
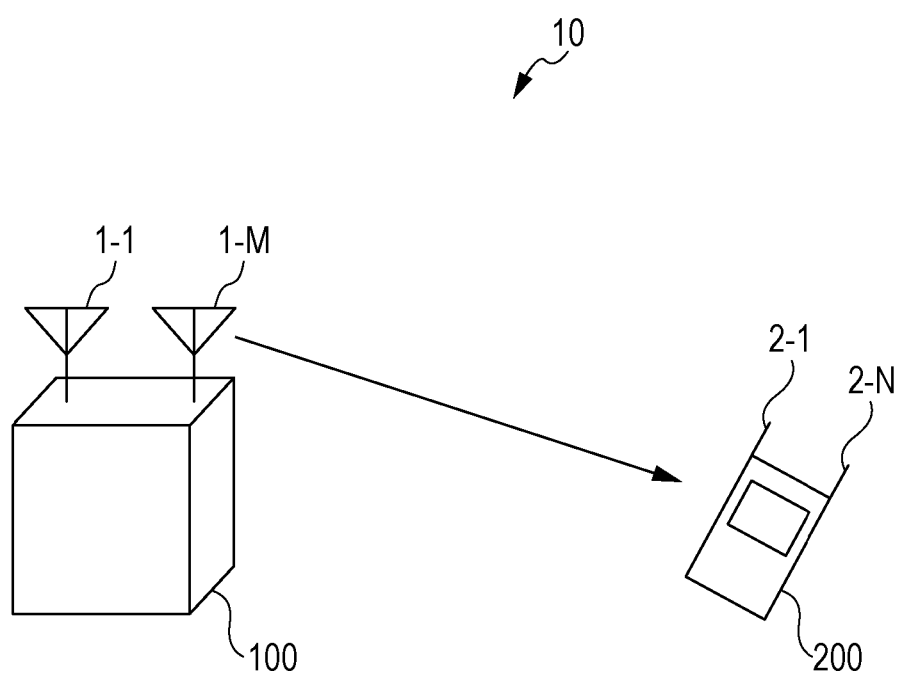
FIG. 1 is a conceptual view illustrating a configuration of a radio communication system 10 according to a first embodiment of the present invention.

A first embodiment of the present invention will be described below with reference to the drawings. FIG. 1 is a conceptual view illustrating a configuration of a radio communication system 10 according to the first embodiment. As illustrated in FIG. 1, the radio communication system 10 includes a base station device 100 having a number M of transmission antennas 1-1 to 1-M, and a mobile station device 200 having a number N of reception antennas 2-1 to 2-N.

Figure 2:
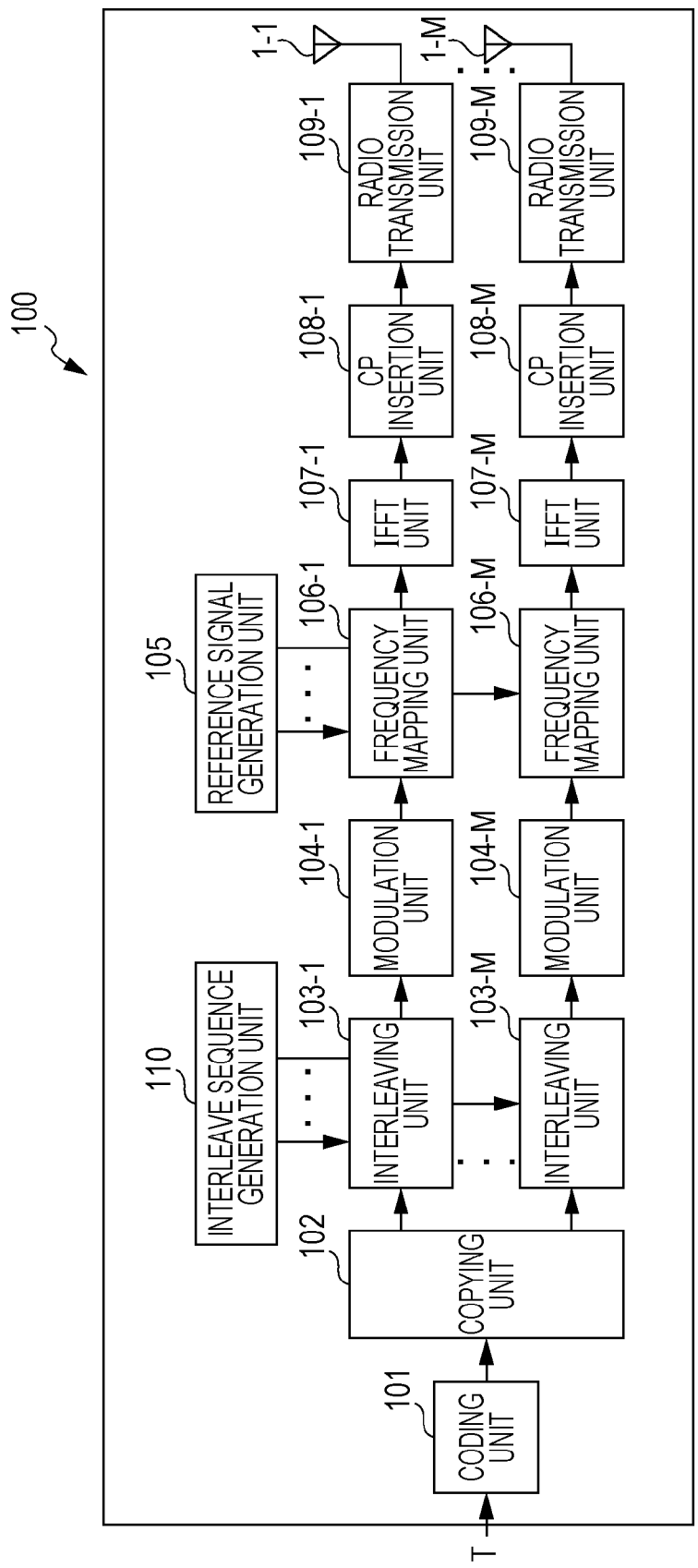
FIG. 2 is a schematic block diagram illustrating a configuration of a base station device 100 according to the first embodiment.

FIG. 2 is a schematic block diagram illustrating a configuration of a base station device 100 according to the first embodiment. It is to be noted that FIG. 2 is a block diagram illustrating only a section related to a downlink, i.e., transmission from the base station device 100 to the mobile station device 200, and other sections to perform communication in an uplink, etc. are omitted. The base station device 100 transmits signals prepared by assigning respectively, to a number M of layers, frequency signal groups that are generated based on the same bit sequence T and that are different per layer, to the mobile station device 200 via the transmission antennas 1-1 to 1-M corresponding respectively to the layers.

The base station device 100 includes a coding unit 101, a copying unit 102, a number M of interleaving units 103-1 to 103-M, a number M of modulation units 104-1 to 104-M, a reference signal generation unit 105, a number M of frequency mapping unit 106-1 to 106-M, a number M of IFFT (Inverse Fast Fourier Transform) units 107-1 to 107-M, a number M of CP (Cyclic Prefix) insertion units 108-1 to 108-M, a number M of radio transmission units 109-1 to 109-M, an interleave sequence generation unit 110, and a number M of transmission antennas 1-1 to 1-M. Each component denoted by a number suffixed with a sub-character, e.g., each of the interleaving units 103-1 to 103-M and the modulation units 104-1 to 104-M, processes a signal in the layer corresponding to the suffixed sub-character. Each of the transmission antennas 1-1 to 1-M transmits the signal in the layer corresponding to the suffixed sub-character. For example, the IFFT unit 107-1 processes a signal in a first layer, and the IFFT unit 107-M processes a signal in an M-th layer.

In the base station device 100, a bit sequent T, i.e., information bits to be transferred, is input to the coding unit 101. The coding unit 101 performs error correction coding, e.g., turbo coding or LDPC (Low Density Parity Check) coding, on the bit sequence T. The bit sequence having been subject to the error correction coding (i.e., coded bit sequence) is input to the copying unit 102. The copying unit 102 copies the coded bit sequence in number corresponding to the number of antennas used for the transmission. In the first embodiment, the number of transmission antennas is M, and the coded bit sequences transmitted from all the transmission antennas 1-1 to 1-M are the same. The copying unit 102 outputs the same coded bit sequence to the interleaving units 103-1 to 103-M.

The interleaving units 103-1 to 103-M perform rearrangement of bit order of the coded bits in accordance with respective interleave sequences that are notified to the interleaving units 103-1 to 103-M from the interleave sequence generation unit 110. Here, the interleave sequences notified from the interleave sequence generation unit 110 are different among the interleaving units 103-1 to 103-M. Furthermore, the interleave sequence generation unit 110 uniquely determine the generated interleave sequences depending on transmission parameters, such as the number of transmission antennas, the length of the coded bit sequence, and the user identification (ID) number. In the mobile station device 200, too, the same interleave sequences are generated in accordance with the transmission parameters. Alternatively, the interleave sequence generation unit 110 may generate the interleave sequences per opportunity of transmission, and may notify information indicating the generated interleave sequences to the mobile station device 200 together with data (bit sequence T).

Subsequent to the interleaving process, similar signal processing is executed on the signals transferred from the transmission antennas 1-1 to 1-M. Therefore, signal processing (executed in the modulation unit 104-1 to the radio transmission unit 109-1) on the signal transferred from the transmission antenna 1-1 is representatively described below, and description of signal processing on the other signals is omitted. The coded bit sequence having been subjected to the rearrangement of bit order in the interleaving unit 103-1 is input to the modulation unit 104-1. The modulation unit 104-1 executes modulation, e.g., QPSK (Quaternary Phase Shift Keying) or 16QAM (16-ary Quadrature Amplitude Modulation), on the coded bit sequence. The modulation signal modulated by the modulation unit 104-1 and reference signals (pilot signals), which are known in the field of transmission/reception devices and which are generated by the reference signal generation unit 105, are input to the frequency mapping unit 106-1.

Here, the reference signals in the downlink, i.e., the reference signals generated by the reference signal generation unit 105, include a reference signal for use in determining a band to be used in the transmission, and a reference signal for use in demodulation. For example, reference signals, called Common-RS (Reference Signal), CRS (Cell Specific RS), CSI-RS (Channel State Information RS), and DM (De-Modulation)-Rs, are known in LTE and LTE-A. The frequency mapping unit 106-1 assigns the input modulation signal and the input reference signals to frequency bands, which are used in the transfer, thereby generating one of the above-mentioned frequency signal groups.

The IFFT unit 107-1 converts the frequency signal group, generated by the frequency mapping unit 106-1, to a signal in the time domain through IFFT. The CP insertion unit 108-1 inserts a CP (Cyclic Prefix) into the signal in the time domain, which has been generated by the IFFT unit 107-1. The radio transmission unit 109-1 converts the signal, which contains the CP having been inserted by the CP insertion unit 108-1, to an analog signal through D/A (Digital to Analog) conversion, and then up-converts the analog signal to a radio frequency. The radio transmission unit 109-1 executes processing on the up-converted signal, such as amplifying transmission power of the up-converted signal by a PA (Power Amplifier), and then outputs the amplified signal to the transmission antenna 1-1. The transmission antenna 1-1 transmits the signal, output from the radio transmission unit 109-1, to the mobile station device 200.

For the second to the M-th layers, the coded bit sequence on the basis of the same bit sequence T is similarly subjected to the rearrangement in accordance with different interleave sequences from one another. Thereafter, the rearranged coded bit sequences are similarly subjected to processing for generating transmission signals, which are then transmitted to the mobile station device 200. Thus, because the interleave sequences generated by the interleave sequence generation unit 110 are different among the layers, the frequency signal groups in the individual layers are also different among the layers. In the first embodiment, the number of layers and the number of transmission antennas are equal to each other, and the description is made in connection with the case where the signals in the individual layers are transmitted respectively by the individual transmission antennas. However, it is just required that the number of transmission antennas is equal to or more than the number of layers. The signals may be transmitted after multiplying a precoding matrix of the number of transmission antennas×the number of layers by the frequency signal groups that are generated by the frequency mapping units 106-1 to 106-M.

Figure 3:
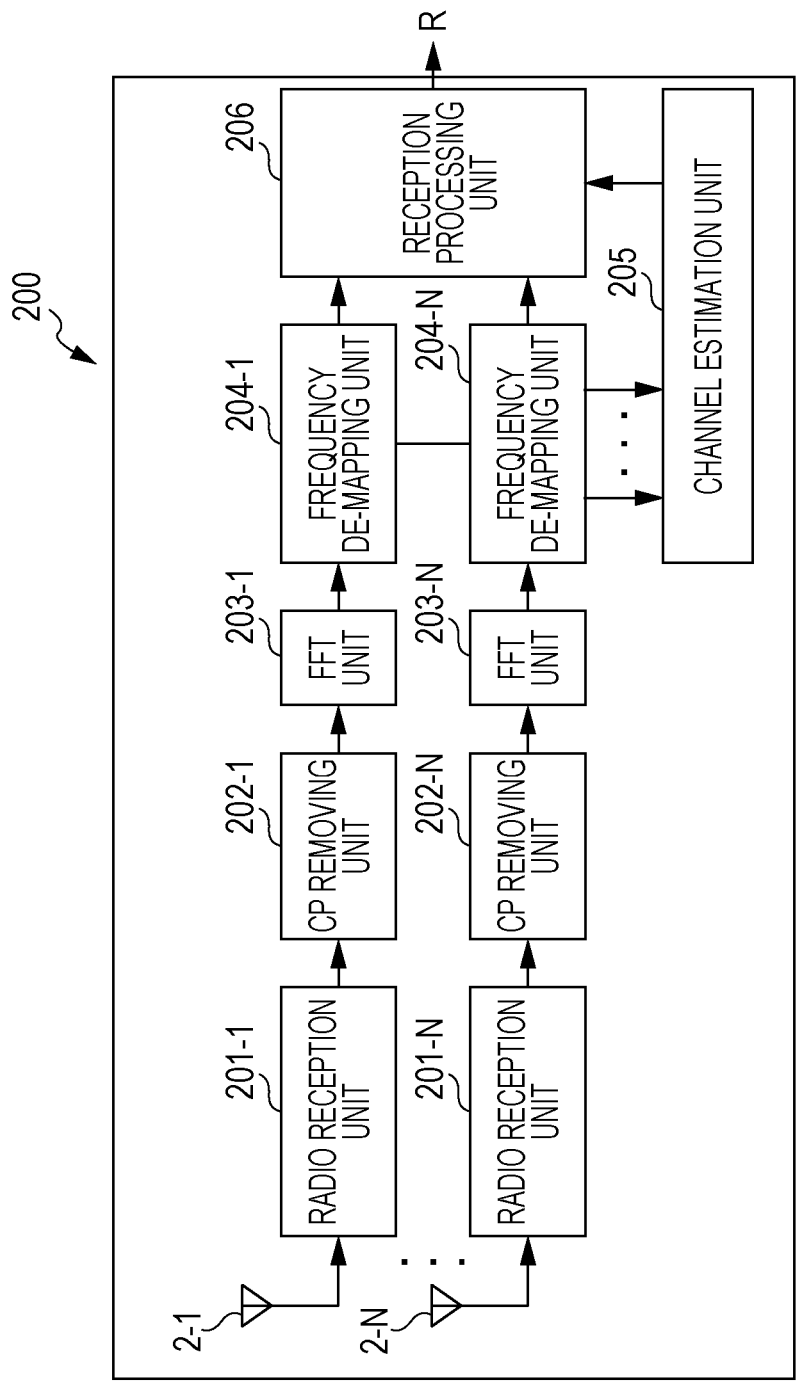
FIG. 3 is a schematic block diagram illustrating a configuration of a mobile station device 200 according to the first embodiment.

FIG. 3 is a schematic block diagram illustrating a configuration of the mobile station device 200 according to the first embodiment. The mobile station device 200 includes a number N of reception antennas 2-1 to 2-N, a number N of radio reception units 201-1 to 201-N, a number N of CP removing units 202-1 to 202-N, a number N of FFT (Fast Fourier Transform) units 203-1 to 203-N, a number N of frequency de-mapping units 204-1 to 204-N, a channel estimation unit 205, and a reception processing unit 206.

The mobile station device 200 illustrated in FIG. 3 receives the signals transmitted from the base station device 100 by employing the reception antennas 2-1 to 2-N. The number M of transmission antennas and the number N of reception antennas may be different or the same. It is also not always required that the number of reception antennas is plural. The signals received by the reception antennas 2-1 to 2-N are processed in a similar manner. Therefore, the following description is representatively made on a block for processing the signal received by the reception antenna 2-1, and description of other blocks (corresponding to 201-2 to 201-N, 202-2 to 202-N, 203-2 to 203-N, and 204-2 to 204-N) is omitted.

The radio reception unit 201-1 down-converts the signal received by the reception antenna 2-1 to a base band frequency, converts it to a digital signal through A/D (Analog to Digital) conversion, and then outputs the digital signal to the CP removing unit 202-1. The CP removing unit 202-1 removes the CP from the digital signal and, after removing the CP, it outputs the digital signal to the FFT unit 203-1. The FFT unit 203-1 performs Fast Fourier Transform on the signal, from which the CP has been removed, for signal conversion from the time domain to the frequency domain. The FFT unit 203-1 outputs the signal in the frequency domain, which has been obtained with the above conversion, to the frequency de-mapping unit 204-1. After extracting the transferred data signal and the reference signals multiplexed in time and frequency, the frequency de-mapping unit 204-1 outputs the data signal to the reception processing unit 206 and the reference signals to the channel estimation unit 205, respectively. While the foregoing processing has been described for the reception antenna 2-1, similar processing to that for the reception antenna 1-1 is executed on the signals received by the other reception antennas 2-2 to 2-N, as described above. Thus, the reference signals having been extracted by the frequency de-mapping units 204-2 to 204-N are input to the channel estimation unit 205. The data signals having been extracted by the frequency de-mapping units 204-2 to 204-N are input to the reception processing unit 206.

The channel estimation unit 205 estimates a frequency response of the channel per combination of the transmission antennas 1-1 to 1-M of the base station device 100 and the reception antennas 2-1 to 2-N of the base station device 100 based on the reference signals having been extracted by the frequency de-mapping units 204-1 to 204-N, and then outputs the estimated frequency response to the reception processing unit 206. From the data signals having been extracted by the frequency de-mapping units 204-1 to 204-N, the reception processing unit 206 restores the bit sequence, transmitted from the base station device 100, by employing the frequency response of the channel, which has been estimated by the channel estimation unit 205, and then outputs the restored bit sequence as a received bit sequence. When restoring the bit sequence, the reception processing unit 206 applies turbo equalization by repeatedly executing removal of interference and decoding of the error correction coding.

Figure 4:
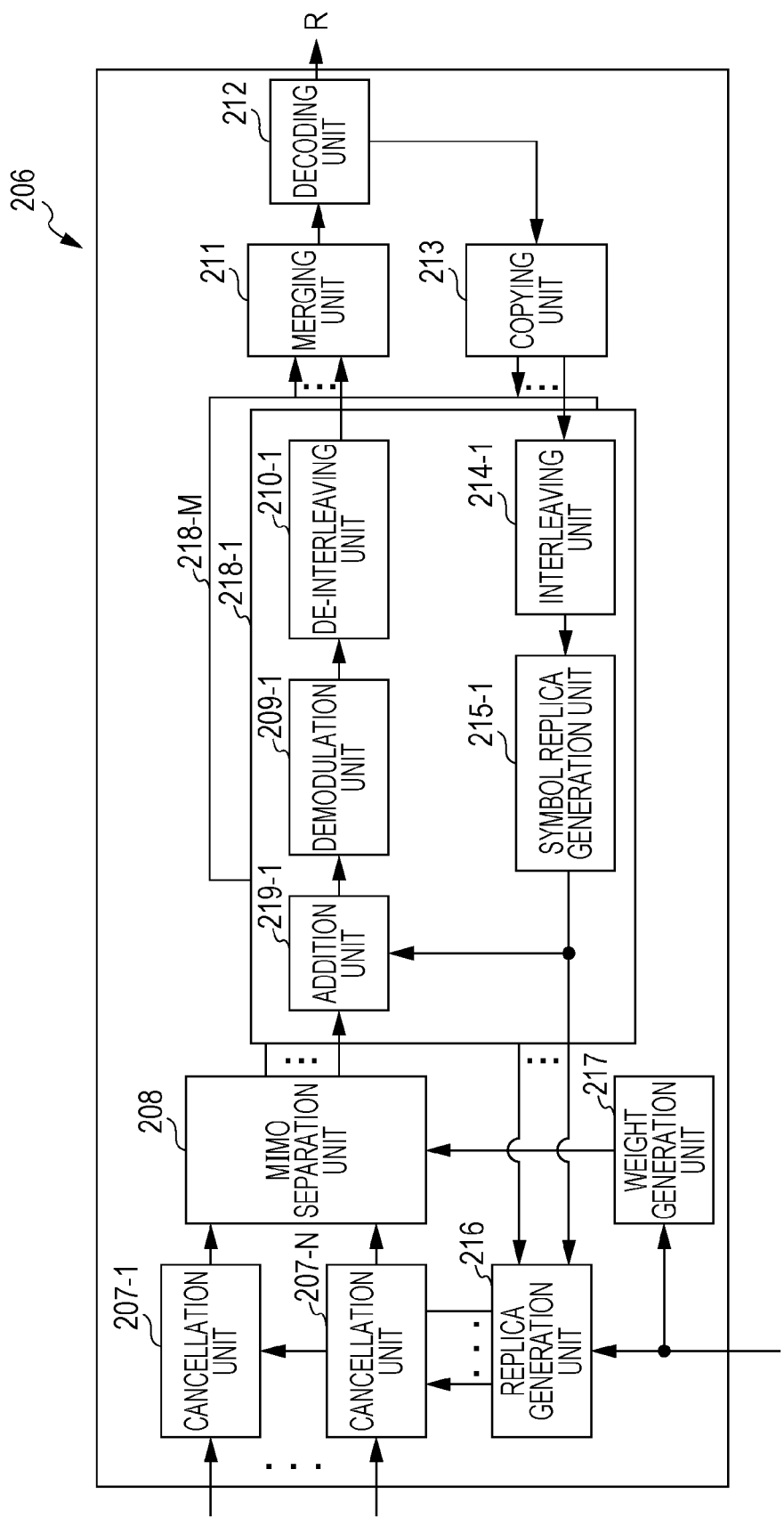
FIG. 4 is a schematic block diagram illustrating a configuration of a reception processing unit 206 according to the first embodiment.

FIG. 4 is a schematic block diagram illustrating a configuration of a reception processing unit 206 in the mobile station device 200 (FIG. 3). The reception processing unit 206 includes a number N of cancellation units 207-1 to 207-N, an MIMO (Multi-Input Multi-Output) separation unit 208, a number M of layer processing units 218-1 to 218-M, a combining unit 211, a decoding unit 212, a copying unit 213, a replica generation unit 216, and a weight generation unit 217. The layer processing units 218-1 to 218-M execute processing of the signals transmitted from the transmission antennas 2-1 to 2-M and corresponding to the respective suffixed subcharacters. Each of the layer processing units 218-1 to 218-M includes an addition unit 219, a demodulation unit 209, a de-interleaving unit 210, an interleaving unit 214, and a symbol replica generation unit 215. In the following description, the demodulation unit 209, the de-interleaving unit 210, the interleaving unit 214, and the symbol replica generation unit 215 are suffixed with a similar sub-character to that assigned to the corresponding layer processing unit. For example, the demodulation unit 209 in the layer processing unit 218-1 is expressed by the demodulation unit 209-1.

The data signals output to the reception processing unit 206 from the frequency de-mapping units 204-1 to 204-N are input to the cancellation units 207-1 to 207-N, respectively. Thus, the data signal output from the frequency de-mapping unit 204-1 is input to the cancellation unit 207-1. The data signal output from the frequency de-mapping unit 204-2 is input to the cancellation unit 207-2. Furthermore, the frequency response of the channel per transmission antenna, which has been estimated by the channel estimation unit 205, is input to both the replica generation unit 216 and the weight generation unit 217.

The cancellation unit 207-1 subtracts a replica of the signal received by the reception antenna 2-1, the replica being input from the replica generation unit 216, from the data signal input from the frequency de-mapping unit 204-1. The cancellation unit 207-1 outputs a signal remaining after the subtraction to the MIMO demultiplexing unit 208. Similarly, the cancellation units 207-2 to 207-N subtract replicas of the signals received by the corresponding reception antennas, the replicas being input from the replica generation unit 216, from the data signals input from the corresponding frequency de-mapping units 204-2 to 207-N, respectively. The cancellation units 207-2 to 207-N output respective signals remaining after the subtractions to the MIMO demultiplexing unit 208. In first one of repeated processes in which there is no output from the decoding unit 212, the cancellation units 207-1 to 207-N execute nothing and output the data signals input thereto, as they are, to the MIMO demultiplexing unit 208.

An estimation value $H_{mn}$ of the frequency response between the transmission antenna 1-m and the reception antenna 2-n is input to the weight generation unit 217. The weight generation unit 217 generates weights for separating the signals, received by the reception antennas, into the signal per transmission antenna. Herein, m represents an index of the transmission antenna, and it is a value satisfying $1 \leq m \leq M$. Furthermore, n represents an index of the reception antenna, and it is a value satisfying $1 \leq n \leq N$. The weights generated by the weight generation unit 217 are, for example, MMSE (Minimum Mean Square Error) weights or ZF (Zero Forcing) weights. The weights generated by the weight generation unit 217 are input to the MIMO demultiplexing unit 208.

The MIMO demultiplexing unit 208 executes MIMO demultiplexing into respective signals in the individual layers corresponding to the transmission antennas 1-1 to 1-M by multiplying the remaining signals, which are output from the cancellation units 207-1 to 207-N, by the weights input from the weight generation unit 217. The MIMO demultiplexing unit 208 outputs the signals, obtained after the MIMO demultiplexing, to the corresponding layer processing units 218-1 to 218-M, respectively. For example, the signal obtained after the MIMO demultiplexing and transmitted from the transmission antenna 1-1 is output to the addition unit 219-1 in the layer processing unit 218-1. The signal transmitted from the transmission antenna 1-2 is output to the addition unit 219-2 in the layer processing unit 218-2.

The addition unit 219-1 adds the symbol replica, generated by the symbol replica generation unit 215-1 (described later), to the signal input from the MIMO demultiplexing unit 208, and outputs the calculation result to the demodulation unit 209-1. Similarly, the addition units 219-2 to 219-M add the corresponding symbol replicas to the corresponding signals input from the MIMO demultiplexing unit 208, respectively. Each of the demodulation units 209-1 to 209-M executes demodulation, which corresponds to the modulation scheme employed in the base station device 100, on the signal input from the corresponding addition unit 219 for conversion to a bit LLR (Log Likelihood Ratio) of the coded bit sequence. Each of the demodulation units 209-1 to 209-M outputs the converted bit LLR to corresponding one of the de-interleaving units 210-1 to 210-M. For example, the demodulation unit 209-1 outputs the bit LLR to the de-interleaving unit 210-1, and the demodulation unit 209-2 outputs the bit LLR to the de-interleaving unit 210-2.

Each of the de-interleaving units 210-1 to 210-M executes rearrangement, which is reversed to the interleaving executed by the corresponding one 103 of the interleaving units 103-1 to 103-M in the base station device 100, on the input bit LLR, and outputs the rearrangement result to the combining unit 211. For example, the de-interleaving unit 210-1 executes rearrangement to de-interleave the rearrangement having been performed by the interleaving unit 103-1. The de-interleaving unit 210-2 executes rearrangement to de-interleave the rearrangement having been performed by the interleaving unit 103-2. Here, the bit LLR output from the de-interleaving unit 210-m is denoted by $\lambda_m(k)$. More specifically, $\lambda_m(k)$ denotes the bit LLR of a coded bit corresponding to the k-th bit before the interleaving in relation to the m-th transmission antenna 1-m. The de-interleaving unit 210-m outputs $\lambda_m(k)$ to the combining unit 211. Respective bit LLRs corresponding to the transmission antennas 1-1 to 1-M, i.e., $\lambda_1(k)$, $\lambda_2(k)$, ..., $\lambda_m(k)$, are input to the combining unit 211. The respective coded bits transmitted from the transmission antennas 1-1 to 1-M are the same as those copied by the copying unit 102 in the base station device 100. Therefore, those bit LLRs can be merged. The combining unit 211 merges those bit LLRs based on the following formula (1), and calculates $\lambda^A(k)$, i.e., a bit LLR after the merging.

$$\lambda^A(k) = \sum_{m=1}^{M} \lambda_m(k) \tag{1}$$

While the merging method represented by the formula (1) is employed in the first embodiment, weighing merging may be performed for the LLR merging. The decoding unit 212 executes error correction decoding on the output $\lambda^A(k)$ from the combining unit 211. When the repeated process for the turbo equalization is not continuously executed any more, for example, when the number of repetitions has reached a predetermined number of times, the decoding unit 212 executes hard decision for the bit LLR resulting from the error correction decoding, and outputs the result of the hard decision as a bit sequence R.

On the other hand, when the repeated process for the turbo equalization is further continuously executed, the decoding unit 212 outputs the bit LLR resulting from the decoding to the copying unit 213. The copying unit 213 copies the bit LLR in number corresponding to the transmission antennas 1-1 to 1-M. The copied bit LLRs are input to the interleaving units 214-1 to 214-M, respectively. Each of the interleaving units 214-1 to 214-M executes bit rearrangement, which is similar to that having been performed by the corresponding one 103 of the interleaving units 103-1 to 103-M in the base station device 100, on the input bit LLR. For example, the interleaving unit 214-1 executes rearrangement similar to that having been performed by the interleaving unit 103-1. The interleaving unit 214-2 executes rearrangement similar to that having been performed by the interleaving unit 103-2.

The symbol replica generation units 215-1 to 215-M modulate the bit LLRs, which have been subjected respectively to the rearrangements by the interleaving units 214-1 to 214-M, by employing the modulation scheme used in the base station device 100, thus generating respective replicas of the signals transmitted from the transmission antennas 1-1 to 1-M. Here, the replicas are each a software replica having an amplitude proportional to an expectation value, which is generated from the bit LLR. The replica generation unit 216 generates respective replicas of the signals received by the reception antennas 2-1 to 2-N by employing not only the replicas, which are output from the symbol replica generation units 215-1 to 215-M and which correspond to all the transmission antennas, but also the channel estimation value input from the channel estimation unit 205. The replicas of the received signals, thus generated by the replica generation unit 216, are input to the cancellation units 207-1 to 207-N, respectively. The cancellation units 207-1 to 207-N subtract the replicas of the received signals from the received signals, respectively. A reception process is executed by repeating the above-described processes.

With the first embodiment, as described above, the signals transmitted in plural layers are subjected to the MIMO demultiplexing and then merged in the combining unit 211. As a result, the merging can be efficiently executed without depending on the channel estimation value that is grasped on the transmitting side (i.e., in the base station device 100), and signal transfer can be realized with high efficiency of frequency use.

Furthermore, with the first embodiment, when the same bit sequence is transmitted in signal transfer using multiple antennas, it is not needed on the transmitting side (i.e., in the base station device 100) to execute, e.g., a process of multiplying a precoding vector while sharing channel information with the receiving side (i.e., in the mobile station device 200). Accordingly, the influence of an error in the channel estimation is reduced, and more satisfactory propagation characteristics can be realized. As a result, signal transfer can be performed with higher efficiency of frequency use. Moreover, transmission diversity with satisfactory propagation characteristics can be realized without sharing the channel information. As a result, durability against time-dependent variations of the channel is high, and degradation of the propagation characteristics is small even in a state moving at a high speed. Still further, even in a propagation environment where frequency selectivity is strong, since the transmitted bit sequences pass through different channels for the individual antennas, a coding gain can be increased.

While the first embodiment has been described above in connection with the configuration of transmitting the signals in the individual layers from the corresponding transmission antennas in the base station device 100, the present invention is not limited to that configuration. For example, the configuration may be modified so as to generate signals, transmitted from the individual transmission antennas, by multiplying a precoding matrix by respective outputs of the frequency mapping units 106-1 to 106-M. Even with that modified configuration, by merging the signals transmitted in the plural layers in the combining unit after executing the MIMO demultiplexing on those signals, the merging can be efficiently performed, as in the first embodiment.

Second Embodiment

Figure 5:
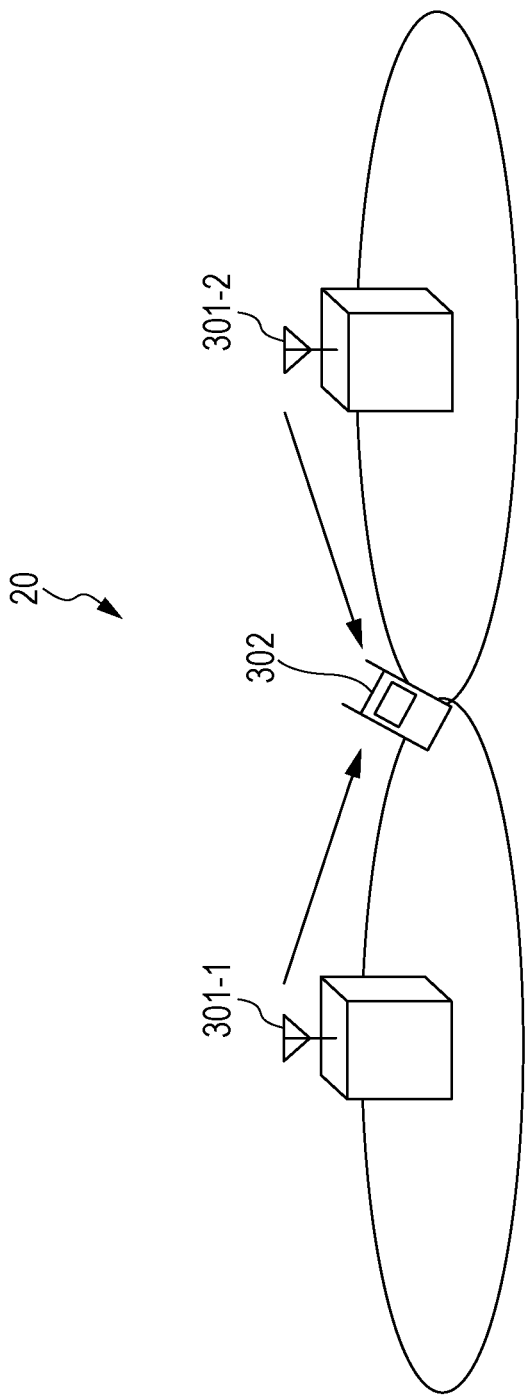
FIG. 5 is a conceptual view illustrating a configuration of a radio communication system 20 according to a second embodiment of the present invention.

A second embodiment of the present invention will be described below with reference to the drawings. FIG. 5 is a conceptual view illustrating a configuration of a radio communication system 20 according to the second embodiment. In the radio communication system 20, Coordinated Multi-Point transmission and reception (CoMP) is performed in a downlink. In more detail, two base station devices 301-1 and 301-2 transmit the same data to one mobile station device 302. Herein, the first base station device 301-1 and the second base station device 301-2 have a similar configuration, but they are different in rearrangement patterns prepared in their interleaving units. More specifically, the base station device 301-1 transmits a signal in a first layer, and the base station device 301-2 transmits a signal in a second layer. Furthermore, signals generated from the same bit sequence, but differing from each other are assigned to those two layers. A mobile station device 302 has a similar configuration to that of the mobile station device 200 (FIG. 3) in the first embodiment.

Figure 6:
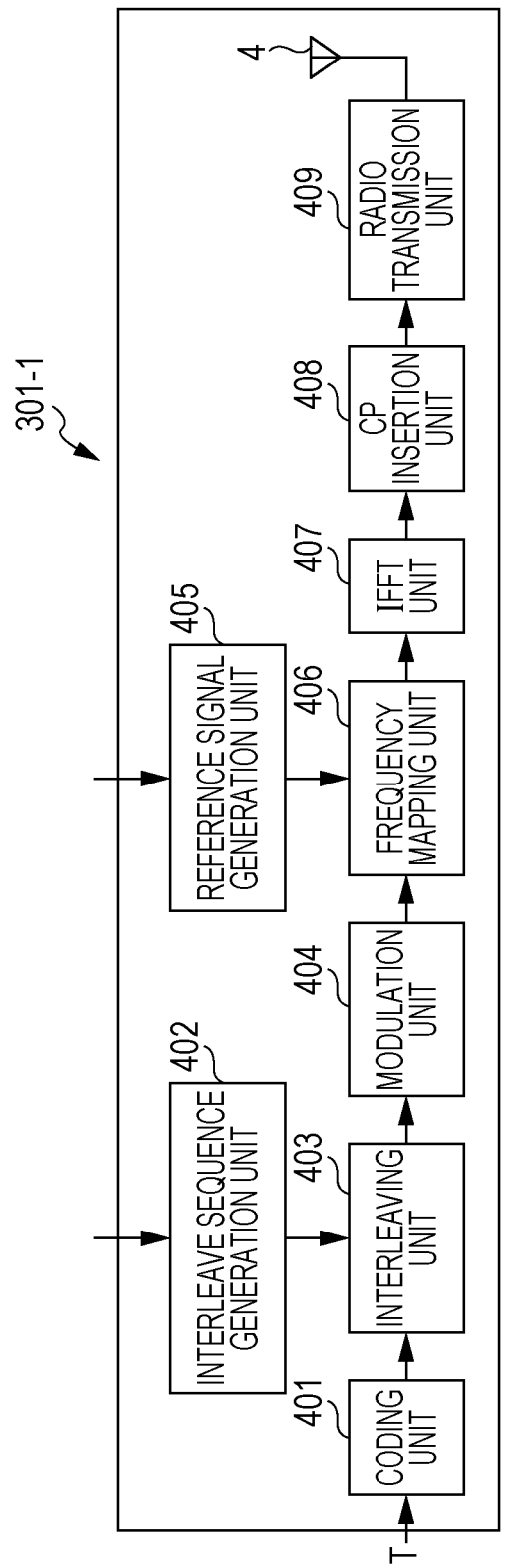
FIG. 6 is a schematic block diagram illustrating a configuration of a base station device 301-1 according to the second embodiment.

FIG. 6 is a schematic block diagram illustrating a configuration of the base station device 301-1. The base station device 301-1 includes a coding unit 401, an interleave sequence generation unit 402, an interleaving unit 403, a modulation unit 404, a reference signal generation unit 405, a frequency mapping unit 406, an IFFT unit 407, a CP insertion unit 408, a radio transmission unit 409, and a transmission antenna 4. An information bit sequence T notified from another coordinating base station (i.e., the base station device 301-2 in this embodiment) is coded by the coding unit 401. While FIG. 6 illustrates the case where the notified information is an information bit sequence before coding, a coded bit sequence after coding may be shared between the base stations in order to prevent an increase of calculation volume, which is caused by executing the coding process in each of the base stations.

Next, an interleave sequence is determined by the interleave sequence generation unit 402, based on the interleave sequence notified from the coordinating base station, such that different interleave sequences are used in all the base stations. Here, the interleave sequence generation unit 402 may be set to make different interleave sequences used in all the base stations by notifying the interleave sequences among the coordinating base stations. As an alternative, respective interleave sequences may be uniquely determined based on a parameter such as a base station identification number (cell ID) or a coded bit sequence length, which is known in the field of transmission/reception devices, without notifying the interleave sequence. The generated interleave sequence is input to the interleaving unit 403.

Using the input interleave sequence, the interleaving unit 403 rearranges a temporal order of the coded bit sequence, which has been coded by the coding unit 401. The coded bit sequence having been subjected to the interleaving is input to the modulation unit 404. The modulation unit 404 performs modulation, e.g., QPSK or 16QAM, on the input coded bit sequence, thereby generating a modulated symbol. The reference signal generation unit 405 generates, from a reference signal sequence shared with the coordinating base station, a reference signal in orthogonal relation to that in the other base station(s). The reason resides in enabling channel characteristics for all the base stations coordinating with respect to the mobile station device 302 to be estimated.

Next, the frequency mapping unit 406 maps (arranges) the modulated symbol output from the modulation unit 403 and the reference signal output from the reference signal generation unit 405 to an arbitrary frequency within a system band. For example, a position where the modulated symbol is to be arranged is generally determined by a method using a scheduler that determines how radio resources are assigned to the individual mobile stations. However, other methods can also be optionally employed insofar as the modulated symbol is arranged to an arbitrary frequency within the system band. Furthermore, the reference signal may be arranged to a position that is previously defined in the system. The reference signal may be multiplexed in terms of time or code insofar as the reference signal is multiplexed by a method enabling the multiplexed signal to be demultiplexed in the mobile station device 302. The frequency signal obtained with the frequency mapping is converted to a time-domain signal in the IFFT unit 407. The CP insertion unit 408 inserts the CP into the time-domain signal. The radio transmission unit 409 executes D/A conversion and up-conversion on the time-domain signal, which contains the CP having been inserted, and then transmits the converted signal from the transmission antenna 4.

The bit sequence, the interleave sequence, and the reference signal sequence, which are to be shared with the coordinating base station device, can be shared, for example, by a method using the wired X2 interface that is specified in the LTE, etc., or using the IP (Internet Protocol) network. Alternatively, when stations are connected through an optical fiber as in the case of employing an RRH (Remote Radio Head) or a remote antenna, the above-mentioned sequences may be shared using the optical fiber. While the second embodiment has been described in connection with the cooperation between the base station devices, the present invention can be applied to any type of method for transmitting the same data in cooperation among a plurality of transmission points (e.g., a relay station device, a femto base station device, and a pico base station device). In addition, the present invention can be similarly applied to a system including three or more base station devices.

As mentioned above, the configuration of the mobile station device 302 is similar to that of the mobile station device 200 in FIG. 3. Thus, in the second embodiment, as in the first embodiment, the signals transmitted in the plural layers are merged in the combining unit 211 after being subjected to the MIMO demultiplexing. As a result, the merging can be efficiently executed without depending on the channel estimation value that is grasped on the transmitting side (i.e., in the base station devices 301-1 and 301-2), and signal transfer can be realized with high efficiency of frequency use.

Furthermore, with the above-described configuration, there is no necessity of establishing synchronism at such high accuracy as enabling in-phase merging to be performed at a waveform level between the stations in the case of coordinate communication, and installation of the system is facilitated. Moreover, it is no longer required to share the channel state between the transmitting side and the receiving side. Accordingly, control information related to feedback is also no longer required, and the coordinate communication can be efficiently performed. In addition, since the individual base station devices perform the transmission by employing at least two different interleave sequences and a high coding gain is obtained, a transfer characteristic is higher than that in the case of merging at the waveform level.

While the second embodiment is configured to transmit respective signals in the individual layers from the base station devices 301-1 and 301-2, the configuration may be modified such that the signal to be transmitted is generated by multiplying a precoding matrix by the output of the frequency mapping unit 406. Alternatively, respective signals to be transmitted from the individual base station devices may be generated by, in any one of the coordinating base station devices, executing mappings in the frequency mapping units 106-1 to 106-M as in the base station device 100, and multiplying a precoding matrix by the mapping result. Even with those modified configurations, since the signals transmitted in the plural layers are merged in the combining unit after being subjected to the MIMO demultiplexing, those signals can be efficiently merged as in the second embodiment.

Third Embodiment

A third embodiment of the present invention will be described below with reference to the drawings. A radio communication system 10a according to the third embodiment performs transmission diversity transfer in which CSI (Channel State Information) is not shared in an uplink (i.e., transfer from a mobile station device 100a to a base station device 200a) using multiple antennas. It is to be noted that the following description is made in connection with the case of employing, as a transfer scheme, DFT-S-OFDM (Discrete Fourier Transform Spread OFDM) instead of OFDM (Orthogonal Frequency Division Multiplexing) that is used in the first and second embodiments.

Figure 7:
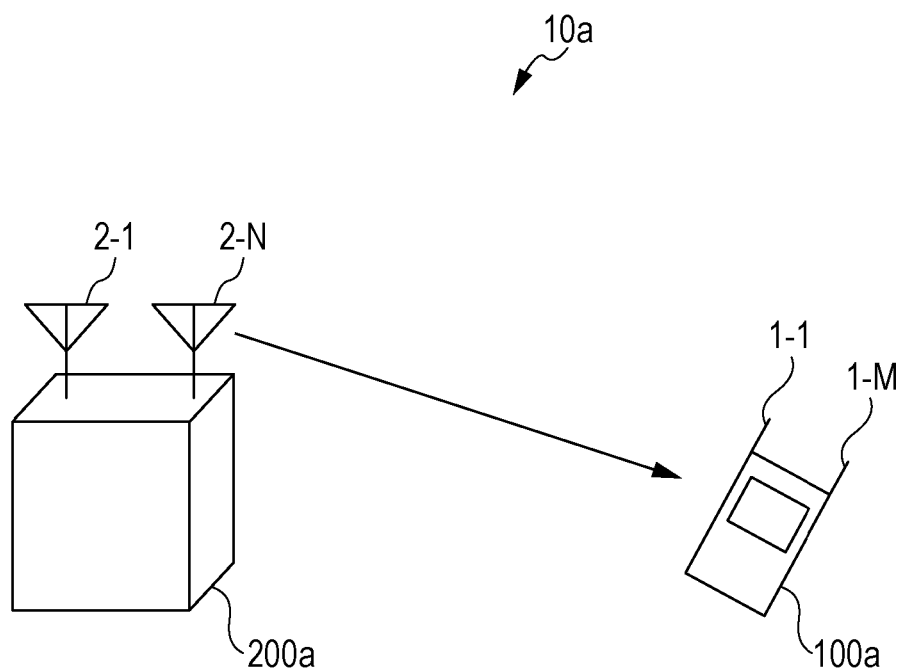
FIG. 7 is a conceptual view illustrating a configuration of a radio communication system 10a according to a third embodiment of the present invention.

FIG. 7 is a conceptual view illustrating a configuration of the radio communication system 10a according to the third embodiment. As illustrated in FIG. 7, the radio communication system 10a includes the mobile station device 100a having a number M of transmission antennas 1-1 to 1-M, and the base station device 200a having a number N of reception antennas 2-1 to 2-N.

Figure 8:
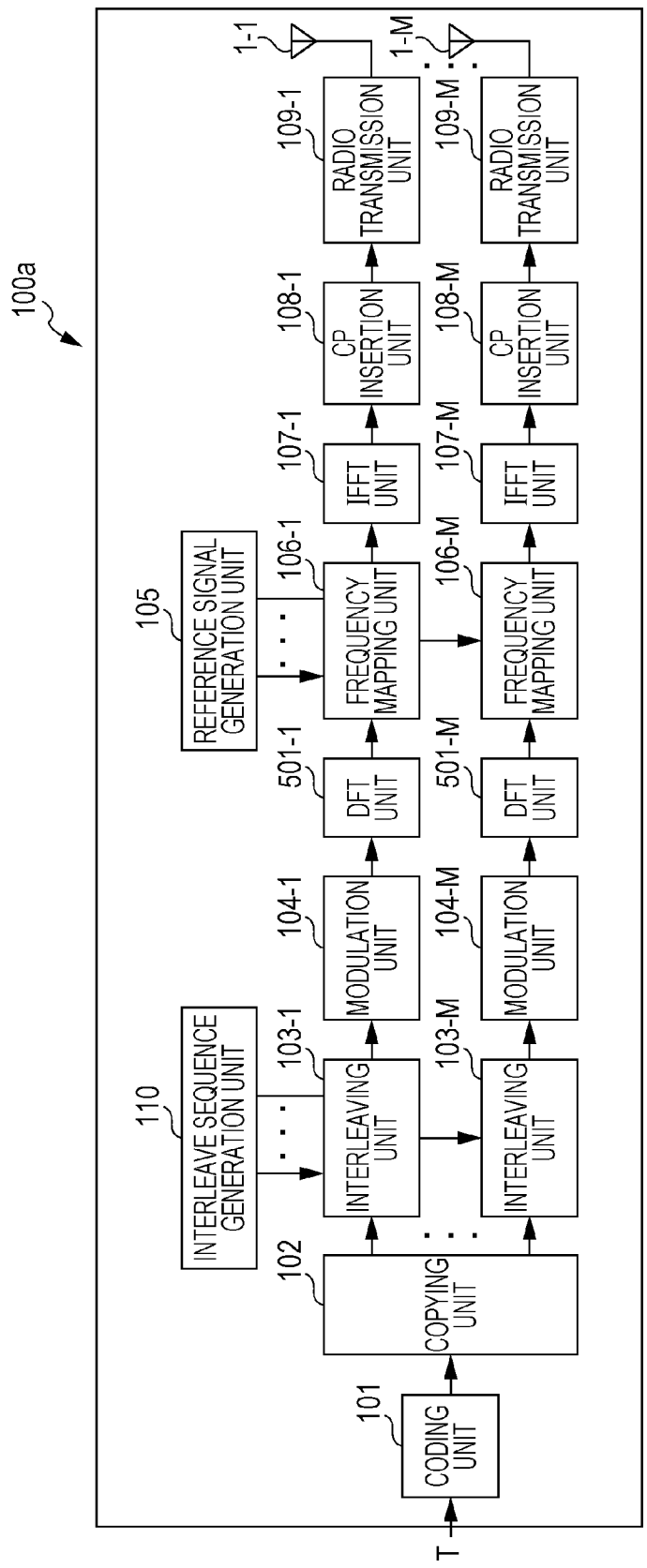
FIG. 8 is a schematic block diagram illustrating a configuration of a mobile station device 100a according to the third embodiment.

FIG. 8 is a schematic block diagram illustrating a configuration of the mobile station device 100a, which serves as a transmission device, according to the third embodiment. It is to be noted that FIG. 8 is a block diagram illustrating only a section related to an uplink, i.e., transmission from the mobile station device 100a to the base station device 200a, and other sections to perform communication in a downlink, etc. are omitted. The configuration of the mobile station device 100a in FIG. 8 is substantially the same as that of the base station device 100 in FIG. 2 except that respective outputs of the modulation units 104-1 to 104-M are input to the frequency mapping units 106-1 to 106-M through DFT units 501-1 to 501-M, respectively. The DFT units 501-1 to 501-M execute Discrete Fourier Transform on respective modulated symbol sequences generated by the modulation units 104-1 to 104-M, thereby generating a frequency-domain signal (data spectrum).

Thus, the mobile station device 100a has such an advantageous effect that, as a result of applying the Discrete Fourier Transform (DFT) to the modulated symbol, a time waveform of the transmission signal has a lower PAPR (Peak to Average Power Ratio) than that obtained with the OFDM. Moreover, unlike the case of the downlink, reference signals generated by the reference signal generation unit 105 include not only DM (De-Modulation)-RS, i.e., a reference signal for use in demodulation, but also SRS (Sounding RS), i.e., a reference signal for use in determining a band to be used for the transfer.

Those reference signals are arranged into respective resources of time and frequency in the frequency mapping units 106-1 to 106-M. Arrangement of data spectra in the frequency mapping units 106-1 to 106-M may be continuous or discontinuous as in the case of OFDM.

The base station device 200a receives the signals transmitted from the mobile station device 100a in FIG. 8. The configuration of the base station device 200a is similar to that in the mobile station device 200 in FIG. 3 except that the base station device 200a includes a reception processing unit 206a instead of the reception processing unit 206 in FIG. 3.

Figure 9:
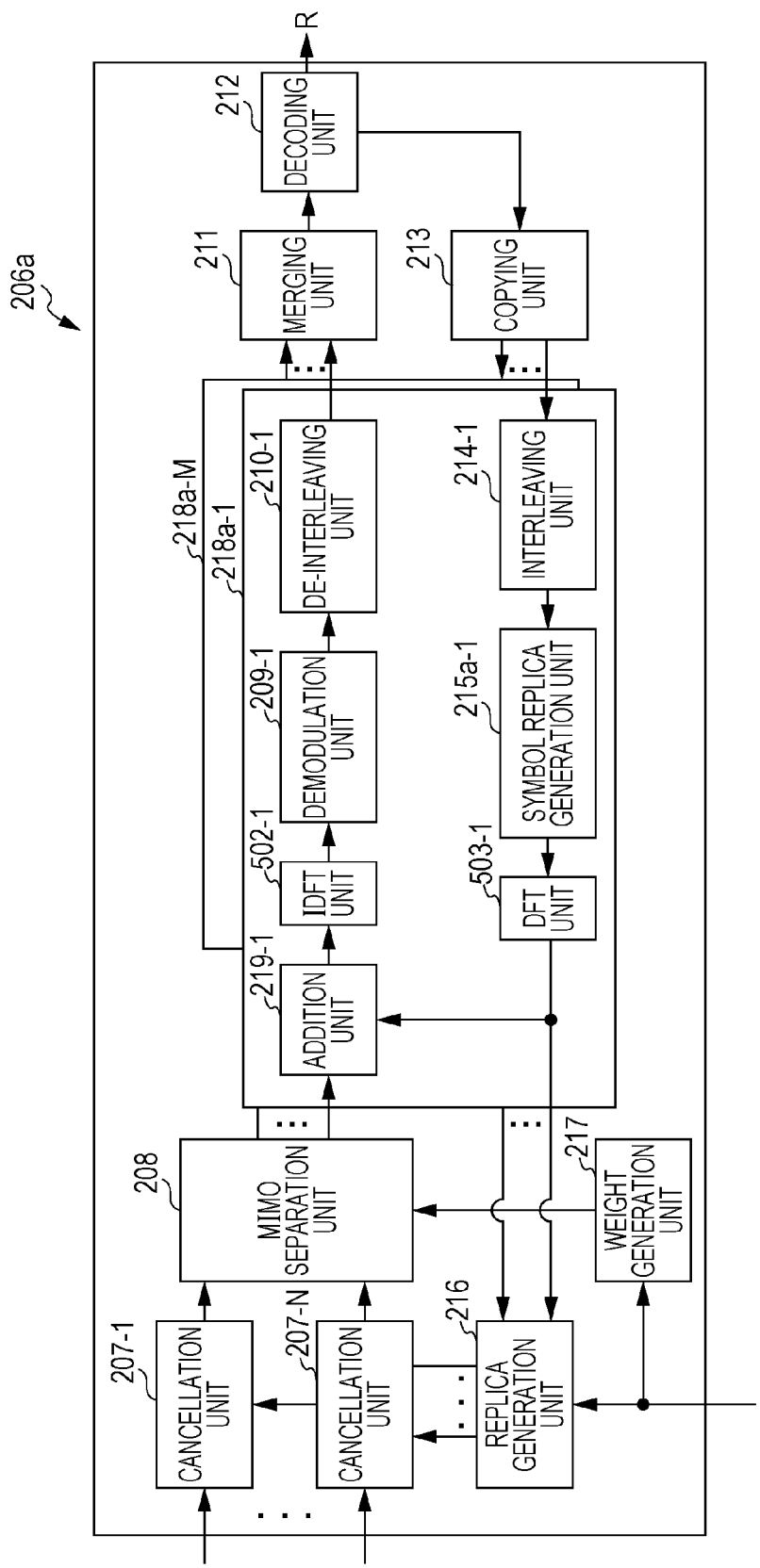
FIG. 9 is a schematic block diagram Illustrating a configuration of a reception processing unit 206a according to the third embodiment.

FIG. 9 is a schematic block diagram illustrating a configuration of the reception processing unit 206a. The configuration of the reception processing unit 206a is substantially the same as that of the reception processing unit 206 illustrated in FIG. 4 except that the reception processing unit 206a includes layer processing units 218a-1 to 218a-M instead of the layer processing units 218-1 to 218-M, respectively. The layer processing units 218a-1 to 218a-M are different from the layer processing units 218-1 to 218-M in the following three points.

The first different point is that the output of the addition unit 219 is input to the demodulation unit 209 after being subjected to Inverse Discrete Fourier Transform (Inverse DFT) in the IDFT unit 502.

The second different point is that an output of a symbol replica generation unit 215a is input to both the replica generation unit 216 and the addition unit 219 after being subjected to the Discrete Fourier Transform in a DFT unit 503.

The third different point is a method for generating a symbol replica in the symbol replica generation unit 215a.

In the case of handling the OFDM signal as in the symbol replica generation unit 215, the bit LLR input to the symbol replica generation unit 215 is directly used as an expectation value for the symbol replica. On the other hand, because DFT-S-OFDM, i.e., single-carrier transfer, is performed in this embodiment, an input to the symbol replica generation unit 215a includes inverse diffusion of the modulated symbol, which is caused by the IDFT. In this embodiment, therefore, an average value of bit LLRs input to the symbol replica generation unit 215a is used as an expectation value of each symbol replica.

In the base station device 200a, as in the mobile station device 200 of FIG. 4, signals transmitted in plural layers are merged in the combining unit 22 after being subjected to the MIMO demultiplexing. As a result, the merging can be efficiently executed without depending on the channel estimation value that is grasped on the transmitting side (i.e., in the mobile station device 100a), and signal transfer can be realized with high efficiency of frequency use. Thus, similar advantageous effects to those in the first and second embodiments can also be obtained even in the case of employing the single-carrier transfer.

Fourth Embodiment

A fourth embodiment of the present invention will be described below with reference to the drawings. The third embodiment has been described in connection with the case where, as in the first and second embodiments, a plurality of different signals are generated by applying an interleave using different interleave sequences to the same bit sequence, and those signals are transmitted in a spatially multiplexed state. In the fourth embodiment, a method of performing an interleave (i.e., rearrangement of a spectrum) in frequency domain is used to obtain similar advantageous effects to those in the first to third embodiments. A practical example of such a method is described below.

A radio communication system 10b according to the fourth embodiment includes, as in the radio communication system 10a of FIG. 7, a mobile station device 100b having a number M of transmission antennas 1-1 to 1-M, and a base station device 200b having a number N of reception antennas 2-1 to 2-N.

Figure 10:
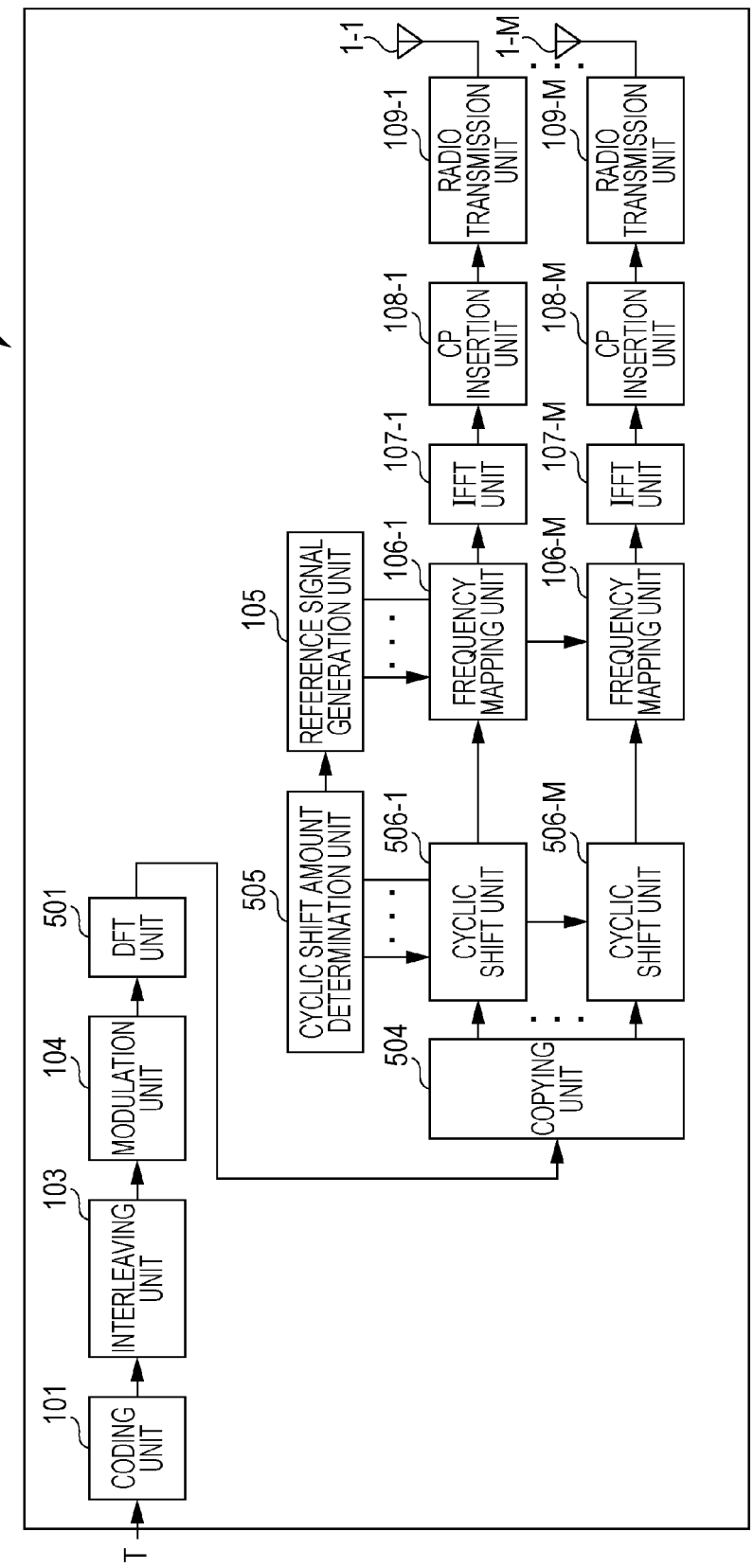
FIG. 10 is a schematic block diagram illustrating a configuration of a mobile station device 100b according to a fourth embodiment of the present invention.

FIG. 10 is a schematic block diagram illustrating a configuration of the mobile station device 100b. The mobile station device 100b includes a coding unit 101, an interleaving unit 103, a modulation unit 104, a DFT unit 501, a copying unit 504, a cyclic shift amount determination unit 505, a number M of cyclic shift units 506-1 to 506-M, a reference signal generation unit 105, a number M of frequency mapping unit 106-1 to 106-M, a number M of IFFT units 107-1 to 107-M, a number M of CP insertion units 108-1 to 108-M, a number M of radio transmission units 109-1 to 109-M, and a number M of transmission antennas 1-1 to 1-M.

In FIG. 10, components corresponding to those in FIG. 8 are denoted by the same signs (101, 103 to 109, 501, and 1-1 to 1-M), and description of those components is omitted.

In the mobile station device 100b, an output of the coding unit 101 is input to the interleaving unit 103 instead of the copying unit. The interleaving unit 103 applies a predetermined interleave to the output (coded bit sequence) of the coding unit 101. The modulation unit 104 modulates the coded bit sequence having been subjected to the predetermined interleave. The DFT unit 501 executes the Discrete Fourier Transform on the modulation result. The copying unit 504 copies each of single-carrier spectra constituting the processing result through the Discrete Fourier Transform in number M, and inputs the copied spectra to the cyclic shift units 506-1 to 502-M, respectively.

The cyclic shift amount determination unit 505 determines respective amounts of cyclic shifts executed in the cyclic shift units 506-1 to 506-M, respectively. At that time, the cyclic shift amount determination unit 505 determines the shift amounts such that the shift amounts are different from one another among the cyclic shift units 506-1 to 506-M. In accordance with the cyclic shift amounts input from the cyclic shift amount determination unit 505, the cyclic shift units 506-1 to 506-M execute different cyclic shifts therein. Here, the term "cyclic shift" implies a cyclic shift in the frequency domain. For example, when the single-carrier spectrum input from the copying unit 504 is S(k) ($0 \leq k \leq N_{DFT}-1$) and the cyclic shift amount input from the cyclic shift amount determination unit 505 is Δ, an output S'(k) ($0 \leq k \leq N_{DFT}-1$) of each of the cyclic shift units 506-1 to 506-M is expressed by the following formula (2).

$$S'(k) = S((k+\Delta) \bmod N_{DFT}) \tag{2}$$

In the fourth embodiment, the cyclic shift is performed in consideration of the fact that the cyclic shift in the frequency domain does not affect the PAPR of a time waveform. However, if the PAPR is out of the problem, the configuration may be modified to interleave a frequency spectrum. Frequency signals obtained as described above are defined as a frequency signal group. Respective outputs of the cyclic shift units 506-1 to 506-M are input to the corresponding frequency mapping units 106-1 to 106-M, respectively. Then, processing is executed in a similar manner to that in the mobile station device 100a of FIG. 8, and resulting signals are transmitted from the transmission antennas 1-1 to 1-M.

The configuration of the base station device 200b in the fourth embodiment is basically the same as that of the base station device 200 in FIG. 3 except that the base station device 200b includes a reception processing unit 206b instead of the reception processing unit 206.

Figure 11:
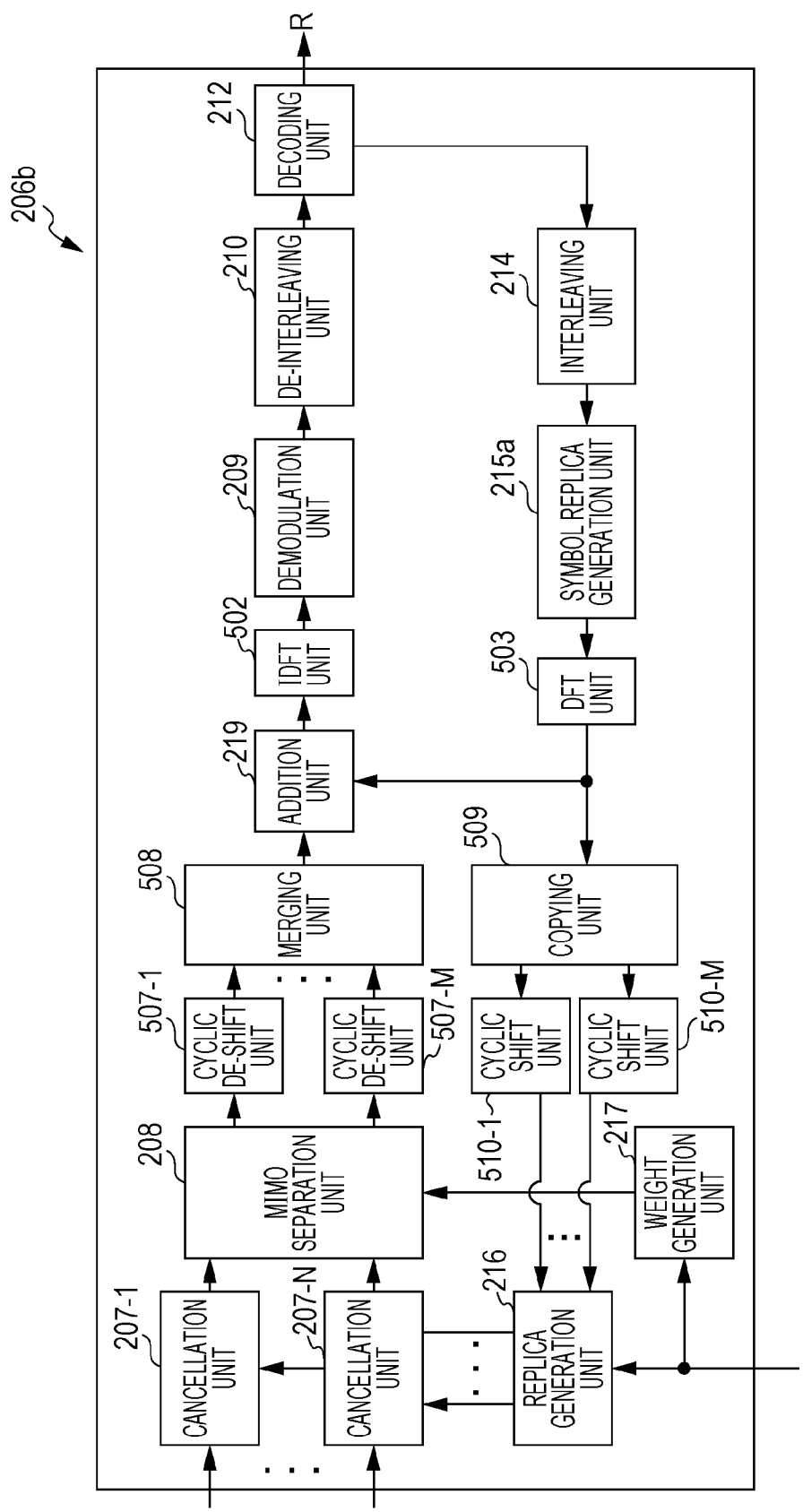
FIG. 11 is a schematic block diagram Illustrating a configuration of a reception processing unit 206b according to the fourth embodiment.

FIG. 11 is a schematic block diagram illustrating a configuration of the reception processing unit 206b. In FIG. 11, components corresponding to those in FIG. 9 are denoted by the same signs (207 to 210, 212, 214, 215a, 216, 217, 502 and 503), and description of those components is omitted. Processing different from the processing in FIG. 9 is described below.

The MIMO demultiplexing unit 208 inputs the respective separated signals in the individual layers to corresponding cyclic de-shift units 507-1 to 507-M. For example, the signal in the layer corresponding to the transmission antenna 1-1 is input to the cyclic de-shift unit 507-1.

The cyclic de-shift units 507-1 to 507-M execute, on the signals input from the MIMO demultiplexing unit 208, processes of de-shifting the cyclic shifts that have been applied by the corresponding cyclic shift units 506-1 to 506-M in FIG. 10, respectively. For example, when the single-carrier spectrum input from the MIMO demultiplexing unit 208 is $G(k)$ ($0 \leq k \leq N_{DFT}-1$) and the cyclic shift amount applied in the cyclic shift unit 506-1 is A, an output $G'(k)$ ($0 \leq k \leq N_{DFT}-1$) of the cyclic de-shift unit 507-1 is expressed by the following formula (3).

$$G'(k) = G((k-\Delta) \bmod N_{DFT}) \quad (3)$$

When the frequency interleave is applied instead of the cyclic shift in the base station device 200b, a process for restoring the order of the frequency spectrum to the original one is executed through de-interleaving.

Respective outputs of the cyclic de-shift units 507-1 to 507-M are input to a combining unit 508. The combining unit 508 merges (adds) respective spectra that are input from the cyclic de-shift units 507-1 to 507-M. Since the orders of the spectra are in match with one another, respective reception energies can be merged. An output of the combining unit 508 is input to the addition unit 219.

Here, the respective frequency spectra transmitted from the number N of transmission antennas are received at different frequencies from one another. In other words, a number N of subcarriers having the same spectrum are received. Moreover, when the number of reception antennas is M, the same spectrum is received at a number MN of points. Thus, such a situation can be regarded as equivalent to the case where the number of reception antennas is MN. Therefore, characteristics can be improved by modifying weights that are multiplied in the MIMO demultiplexing unit 208. In the case of M=3, for example, as illustrated in FIG. 12, frequency spectra surrounded by dotted-line rectangles B1, B2 and B3 are transmitted in different frequencies from respective transmission antennas.

Figure 12:
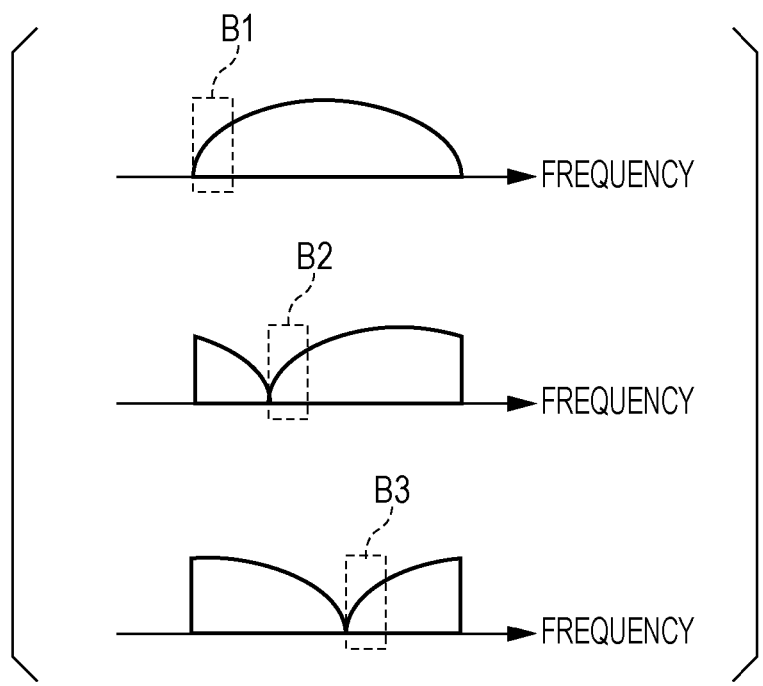
FIG. 12 illustrates an example of the relationship between transmission antennas and frequency spectra in the fourth embodiment.

A chart at the top in FIG. 12 represents the frequency spectrum transmitted from a first transmission antenna. A chart at the middle in FIG. 12 represents the frequency spectrum transmitted from a second transmission antenna. A chart at the bottom in FIG. 12 represents the frequency spectrum transmitted from a third transmission antenna.

In such a case, three simultaneous equations for calculating respective amplitudes of those frequency spectra can be prepared for each of the reception antennas, i.e., for each of the number N of reception antennas. Thus, a number 3N of simultaneous equations are prepared. Stated in another way, the number of reception antennas can be regarded as 3N.

An output of the decoding unit 212 is input to the interleaving unit 214 instead of the copying unit, and an output of the DFT unit 503 is input to the copying unit 509. The copying unit 509 copies each frequency spectrum of a symbol replica, generated by the DFT 503, in number M, and then inputs the number M of copied frequency spectra to corresponding cyclic shift units 505-1 to 505-M. The cyclic shift units 505-1 to 505-M apply, to the respective frequency spectra input from the copying unit 509, the same cyclic shift amounts as those applied in the corresponding cyclic shift units 506-1 to 506-M in FIG. 10. The signals having been subjected to the cyclic shifts are input to the replica generation unit 216.

The fourth embodiment has been described in connection with an example in which the same information is transmitted in different spectra from a plurality of transmission antennas of a transmission device in the case of employing the single-carrier transfer. Thus, in the case of employing the single-carrier transfer, similar advantageous effects to those in the first or second embodiment can also be obtained. In addition, since different cyclic shifts are applied to the frequency spectra instead of applying different bit interleaves, the frequency spectra can be merged without merging the bit LLRs. As a result, the number of times of IDFTs and demodulations can be reduced in comparison with the case of merging the bit LLRs.

The transmission method using the cyclic shift instead of the interleave can be applied to not only the single-carrier transfer, but also multi-carrier transfer such as OFDM. Furthermore, in the case of OFDM, an advantageous effect is obtained in that the PAPR characteristic is not changed even when the frequency interleave is applied instead of the cyclic shift in the frequency domain.

The first to fourth embodiments have been described on the premise that the same modulation scheme is employed in the individual transmission antennas or in the coordinating base station devices. However, the interleave and the modulation scheme may be different for each transmission antenna or each base station. Alternatively, it is also possible to apply the same interleave, and to make only the modulation scheme different for each antenna or each base station. Those modifications can also provide similar advantageous effects to those described above. However, when the modulation scheme is changed, it is needed to execute the demodulation process and the symbol replica generation process in accordance with the modulation scheme that has been used in the transmission. Furthermore, in the case of a coding method using a systematic bit, the coding method may be changed for each antenna or each base station. Similarly, a coding rate may also be changed for each antenna or each base station. Moreover, when the number of transmission antennas or the number of base stations is three or more, the transmission may be executed, for example, by a method using two different interleaves and two different modulation schemes. Thus, forms obtained by combining respective parts of the first to fourth embodiments with each other are also involved in the present invention.

The number of antennas and the number of coordinating base stations are also not limited to particular ones. For example, the number or the arrangement of subcarriers used for data transmission may be set to different values or different positions among the antennas or the base stations. In addition, the present invention may be applied to a system in which clipping in the frequency domain (i.e., cutting of a frequency component) is performed on the DFT-S-OFDM.

Programs operating in the mobile station devices and the base station devices according to the first to fourth embodiments are programs (i.e., programs for operating a computer), which control a CPU, etc. so as to realize the functions of the first to fourth embodiments of the present invention. Information handled in those devices is temporarily held in a RAM during processing thereof, and then stored in any of various ROMs and HDDs. The stored information is read by the CPU, as required, to be corrected and/or rewritten. A recording medium for storing the programs may be any of semiconductor media (such as ROM and a nonvolatile memory card), optical recording media (such as DVD, MO, MD, CD, and BD), and magnetic recording media (such as a magnetic tape and a flexible disk). Moreover, the functions of the above-described first to fourth embodiments, i.e., the functions of the present invention, can be realized not only by executing the loaded programs, but also by executing processing in accordance with instructions of the programs in cooperation with an operating system or at least one other application program, etc.

In the case of circulating the programs through markets, the programs may be circulated in a state stored in a portable recording medium, or may be transferred to a server computer that is connected via a network, e.g., the Internet. In the latter case, a memory in the server computer is also involved in the present invention. Furthermore, a part or the whole of the mobile station devices and the base station devices according to the above-described first to fourth embodiments may be realized in the form of an LSI, i.e., an integrated circuit. Various functional blocks of the mobile station devices and the base station devices may be individually realized in the form of chips, or a part or the whole of those functional blocks may be integrated into the form of a chip. A method of realizing the integrated circuit is not limited to the use of an LSI, and the method may be realized by employing a dedicated circuit or a universal processor. In addition, if a technique of realizing an integrated circuit instead of the LSI technique appears with the progress of the semiconductor technology, the integrated circuit using such a technique can also be used.

While the first to fourth embodiments of the present invention have been described in detail above with reference to the drawings, practical configurations are not limited to those described above in the first to fourth embodiments, and changes in design, etc. without departing from the gist of the present invention are also involved in the scope of claims specified in the present invention.

INDUSTRIAL APPLICABILITY

The present invention can be suitably applied to a mobile communication system in which a cellular phone serves as a mobile station device, but application fields of the present invention are not limited to such a mobile communication system.

REFERENCE SIGNS LIST 1-1 to 1-M, 4 . . . transmission antennas
2-1 to 2-N . . . reception antennas
10, 10a, 10b . . . radio communication systems
100, 200a, 100b . . . base station devices
101 . . . coding unit
102 . . . copying unit
103-1 to 103-M . . . interleaving units
104-1 to 104-M . . . modulation units
105 . . . reference signal generation unit
106-1 to 106-M . . . frequency mapping units
107-1 to 107-M . . . IFFT units
108-1 to 108-M . . . CP insertion units
109-1 to 109-M . . . radio transmission units
110 . . . interleave sequence generation unit
200, 100a . . . mobile station devices
201-1 to 201-N . . . radio reception units
202-1 to 202-N . . . CP removing units
203-1 to 203-N . . . FFT units
204-1 to 204-N . . . frequency de-mapping units
205 . . . channel estimation unit
206, 206a, 206b . . . reception processing units
207-1 to 207-N . . . cancellation units
208 . . . MIMO demultiplexing unit
209-1 to 209-M . . . demodulation units
210-1 to 210-M . . . de-interleaving units
211 . . . combining unit
212 . . . decoding unit
213 . . . copying unit
214-1 to 214-M . . . interleaving units
215-1 to 215-M, 215a-1 to 215a-M . . . symbol replica generation units
216 . . . replica generation unit
217 . . . weight generation unit
218-1 to 218-M, 218a-1 to 218a-M . . . layer processing units
219-1 to 219-M . . . addition units
301-1, 301-2 . . . base station devices
302 . . . mobile station device
401 . . . coding unit
402 . . . interleave sequence generation unit
403 . . . interleaving unit
404 . . . modulation unit
405 . . . reference signal generation unit
406 . . . frequency mapping unit
407 . . . IFFT unit
408 . . . CP insertion unit
409 . . . radio transmission unit
501-1 to 501-M . . . DFT units
502-1 to 502-M . . . IDFT units
503-1 to 503-M . . . DFT units
504 . . . copying unit
505 . . . cyclic shift amount determination unit
506-1 to 506-M . . . cyclic shift units
507-1 to 507-M . . . cyclic de-shift units
508 . . . combining unit
509 . . . copying unit
510-1 to 510-M . . . cyclic shift units

The invention claimed is:

1. A reception device comprising:
a reception unit for receiving signals transmitted by assigning respectively a plurality of different frequency signal groups, which are generated based on a same bit sequence, to a plurality of layers;
an MIMO demultiplexing unit for implementing MIMO demultiplexing of the signals, received by the reception unit, into the frequency signal groups corresponding respectively to the plural layers;
a de-interleaving unit for applying different de-interleaves, for each of the plural layers, to the frequency signal groups resulting from the MIMO demultiplexing implemented by the MIMO demultiplexing unit and corresponding respectively to the plural layers;
a demodulation unit for demodulating, for each of the plural layers, the frequency signal groups having been subjected to the de-interleaves by the de-interleaving unit; and
a combining unit for merging individual items of information based on the demodulated frequency signal groups, the items of information corresponding respectively to the plural layers.

2. The reception device according to claim 1, wherein:
the frequency signal groups assigned respectively to the plural layers are frequency signal groups based on bit sequences that are obtained by applying the different interleaves, for each of the plural layers, to a coded bit sequence resulting from channel coding of the same bit sequence, and the items of information merged by the combining unit are bit LLRs obtained by applying the de-interleaves to the bit LLRs, which are based on the frequency signal groups resulting from the separation by the MIMO demultiplexing unit, in order to de-interleave the different interleaves having been applied to each of the plural layers.

3. The reception device according to claim 1, wherein:

the frequency signal groups assigned respectively to the plural layers are signals obtained by applying the different interleaves in a frequency domain for each of the plural layers, and the items of information merged by the combining unit are signals obtained by applying the de-interleaves to the frequency signal groups resulting from the separation by the MIMO demultiplexing unit, in order to de-interleave the different interleaves having been applied for each of the plural layers.

4. The reception device according to claim 3, wherein the interleaves are cyclic shifts in the frequency domain.

* * * * *